(12) United States Patent
Jou (10) Patent No.: US 8,812,242 B2
(45) Date of Patent: Aug. 19, 2014

(54) MELATONIN SUPPRESSION EXTENT MEASURING DEVICE

(75) Inventor: Jwo-Huei Jou, Taipei (TW)

(73) Assignee: National Tsing Hua University, Hsinchu (TW)

( * ) Notice: Subject to any disclaimer, the term of this patent is extended or adjusted under 35 U.S.C. 154(b) by 643 days.

(21) Appl. No.: 13/184,694

(22) Filed: Jul. 18, 2011

(65) Prior Publication Data
US 2012/0303282 A1    Nov. 29, 2012

(30) Foreign Application Priority Data

May 25, 2011    (TW) .............................. 100118247 A (51) Int. Cl.
*G06F 19/00* (2011.01)
*G01J 3/02* (2006.01)

(52) U.S. Cl.
CPC ..................... *G01J 3/0264* (2013.01)
USPC .......... 702/19; 351/159.65; 359/885; 702/66; 702/67

(58) Field of Classification Search
CPC .................... A61M 2021/0044; A61M 21/00; A61M 21/02; A61N 2005/0662; A61N 2005/0667; A61N 5/0618; G02C 5/001; G02C 7/10; G02C 7/12; G01J 3/0264; G06F 19/00; F21V 9/00
USPC ............ 702/4, 19, 66, 67, 124, 159; 315/398; 351/159.65; 359/885; 362/293; 607/88
See application file for complete search history.

(56) References Cited

U.S. PATENT DOCUMENTS 7,520,607 B2 *  4/2009  Casper et al. ............ 351/159.65
8,164,844 B2 *  4/2012  Toda et al. .................... 359/885

* cited by examiner

*Primary Examiner* — John H Le (57) ABSTRACT

The present invention provides a melatonin suppression extent measuring device, which is able to receive and process a light signal to a spectral data, process the spectral data to a percent value of melatonin suppression based on a reference wavelength parameter and a reference quanta parameter through a conversion module, and display the percent value of melatonin suppression; therefore, users can exactly know how many melatonin suppression extent are caused by the light environment which is exposing themselves body.

20 Claims, 7 Drawing Sheets

MELATONIN SUPPRESSION EXTENT MEASURING DEVICE

CROSS-REFERENCE TO RELATED APPLICATION

This application claims foreign priority from a Taiwan Patent Application, Ser. No. 100118247, filed on May 25, 2011.

BACKGROUND OF THE INVENTION

1. Technical Field

The present invention relates to a measuring device, and more particularly, to a melatonin suppression extent measuring device.

2. Description of Related Art

Melatonin is secreted by a gland of Pineal body in human brain, and it has the following influences on physiological functions of human: (1) promoting sleep; (2) affecting emotion; (3) sexual maturity and reproduction; and (4) affecting the immune functions.

Researches have been found that the production and the secretion of melatonin are mainly influenced by the following three factors: (A) light: light is transmitted to hypothalamus through retinal nerves, and then transmitted to pineal body through the sympathetic nerves, so as to inhibit the secretion of melatonin, therefore the secretion of melatonin can be inhibited in higher level under the darker environment; (B) circadian rhythm: hypothalamus, like a biological clock, can affect the secretion of melatonin, so that the concentration of melatonin secreted by pineal body has a significant variation according to circadian rhythm, and the concentration of melatonin in blood in the night is 6 times higher than that in the day according to researches; and (C) electromagnetic wave: an electromagnetic wave can not only inhibit the ability of pineal body for synthesizing melatonin, but also inhibit the activity of the synthesis of melatonin.

Light is indispensable in daily life. The light perceivable by human eyes is called visible light, wherein the major natural light is sunlight, and the artificial light has various kinds, such as candlelight, incandescent lamps, fluorescent lamps, LED lamp, OLED lamps, etc. Generally speaking, the wavelength range of the visible light is about 450 nm to 750 nm; the color components of the visible light include red, orange, yellow, green, blue, purple, etc.

Figure 1:
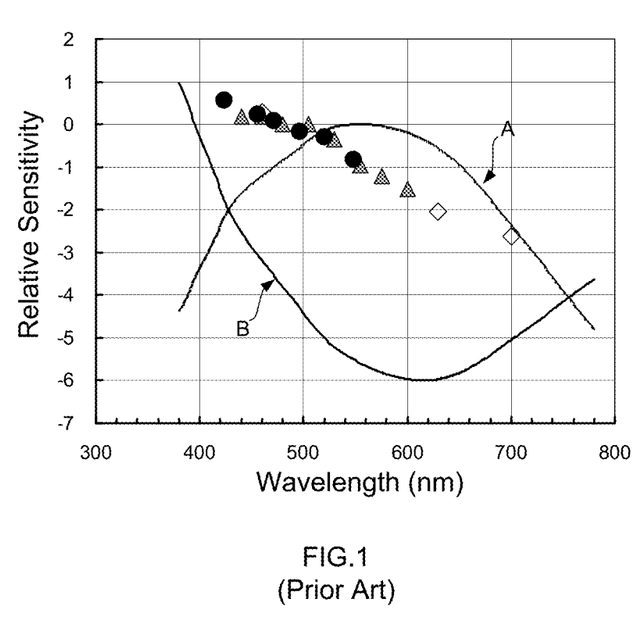
FIG. 1 is a diagram of curves representing relativity between light wavelengths and light sensitivity of melatonin.

According to literatures, different color lights would cause different sensitivity to melatonin of human. Please refer to FIG. 1, which shows a diagram of curves representing relativity between light wavelengths and light sensitivity of melatonin. In FIG. 1, curve A represents a photopic luminosity function for the different color lights, and data group shows the light sensitivity caused by the different color lights to melatonin of human. Apparently, in FIG. 1, melatonin has a higher light sensitivity under the color lights having short wavelengths; on the contrary, melatonin has a lower light sensitivity under the color lights having long wavelengths. So that, naturally, for human beings, who are able to avoid melatonin from being suppressed by way of preventing the bodies thereof to be exposed under the light with short wavelength.

Although the data group in the FIG. 1 shows and proves that melatonin has a higher light sensitivity under the color lights having short wavelengths, literatures have not been found and recorded the following facts: As shown in FIG. 1, curve B represents melatonin suppression extent per lumen for quanta from different wavelengths. The curve B shows, of course, the quanta from short wavelength light caused higher suppression extent on melatonin under unit lumen; However, to man's surprise, the melatonin suppression extent caused by quanta from long wavelength (around 780 nm) is nearly equal to the melatonin suppression extent caused by quanta from short wavelength (around 480 nm).

Therefore, based on the above-mentioned results, it is aware of that, to determine influence on melatonin of human caused by the color light by way of the length of the wavelength is inadequate, the amount of quanta would also make influence on melatonin of human.

Accordingly, the inventor of the present application has made great efforts to make inventive research thereon and eventually provided a melatonin suppression extent measuring device, so as to expect that the melatonin suppression extent measuring device could be used for measuring the melatonin suppression extent caused by the color lights with different wavelengths and quanta, and displaying melatonin suppression extent in value.

BRIEF SUMMARY OF THE INVENTION

The primary objective of the present invention is to provide a melatonin suppression extent measuring device, which is able to receive and process a light signal to a spectral data, and furthermore, processing the spectral data to a percent value of melatonin suppression based on a reference wavelength parameter and a reference quanta parameter through a conversion module, so as to make human exactly know how many melatonin suppression extent are caused by the light environment which is exposing himself body.

Accordingly, to achieve the abovementioned primary objective of the present invention, the inventor proposes a melatonin suppression extent measuring device, comprising:

a light receiving unit, adopted for receiving a light signal;

a first processing unit, coupled to the light receiving unit, wherein the first processing unit is able to receive and process the light signal to a spectral data;

a first memory unit, coupled to the first processing unit for storing the spectral data;

a second processing unit, coupled to the first processing unit and has a conversion module, wherein the second processing unit can further process the spectral data to a percent value of melatonin suppression based on a reference wavelength parameter and a reference quanta parameter through the conversion module;

a second memory unit, coupled to the second processing unit for storing the percent value of melatonin suppression;

a display unit, coupled to the second processing unit and used for displaying the percent value of melatonin suppression; and a power management unit, coupled to the light receiving unit, the first processing unit, the second processing unit, and the display unit for providing power to the light receiving unit, the first processing unit, the second processing unit, and the display unit.

The another objective of the present invention is to provide a melatonin suppression extent measuring device, which is able to process a spectral data to a percent value of melatonin suppression based on a reference wavelength parameter and a reference quanta parameter by way of a first conversion function group and a second conversion function group, so as to make human exactly know how many melatonin suppression extent are caused by the light environment which is exposing himself body.

Thus, in order to achieve the abovementioned another objective of the present invention, the inventor proposes a melatonin suppression extent measuring device, comprising:

a processing unit, having a first conversion function group and a second conversion function group, wherein the processing unit can process a spectral data to a percent value of melatonin suppression based on a reference wavelength parameter and a reference quanta parameter by way of the first conversion function group and the second conversion function group; and a display unit, coupled to the processing unit for displaying the percent value of melatonin suppression.

BRIEF DESCRIPTION OF THE SEVERAL VIEWS OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE INVENTION

To more clearly describe a melatonin suppression extent measuring device according to the present invention, embodiments of the present invention will be described in detail with reference to the attached drawings hereinafter.

Figure 2:
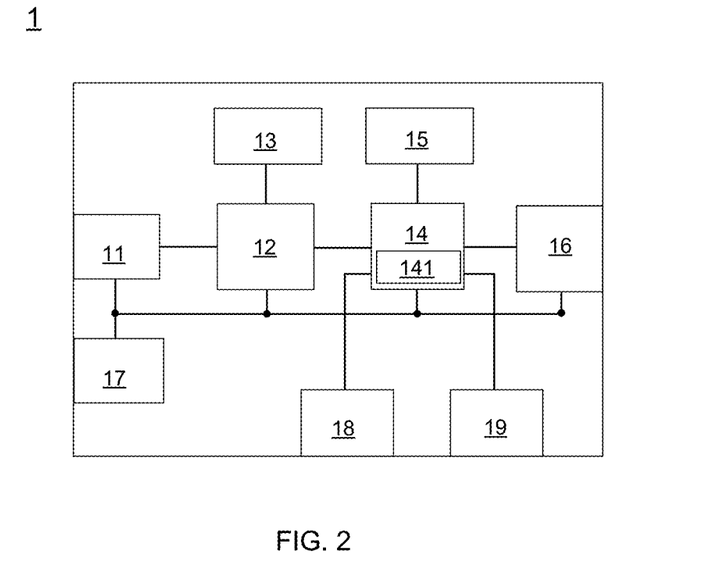
FIG. 2 is a framework view of a melatonin suppression extent measuring device according to the present invention.

Please refer to FIG. 2, which illustrates a framework view of a melatonin suppression extent measuring device according to the present invention. As shown in FIG. 2, the melatonin suppression extent measuring device 1 includes: a light receiving unit 11, a first processing unit 12, a first memory unit 13, a second processing unit 14, a second memory unit 15, a display unit 16, a power management unit 17, a connecting unit 18, and an input unit 19, wherein the light receiving unit 11 is adopted for receiving a light signal.

Figure 3:
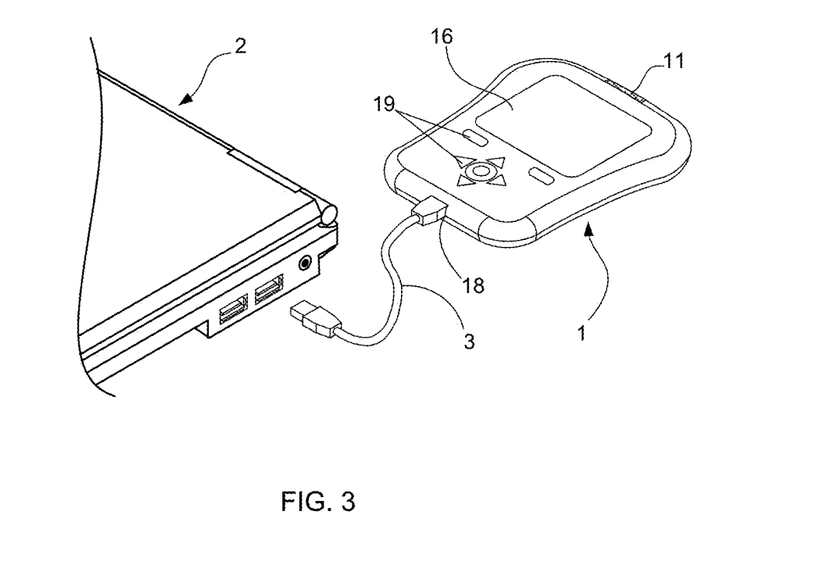
FIG. 3 is a schematic stereo diagram of melatonin suppression extent measuring device according to the present invention.

Continuously referring to FIG. 2, and please simultaneously refer to FIG. 3, which illustrates a schematic stereo diagram of melatonin suppression extent measuring device according to the present invention. As shown in FIG. 2 and FIG. 3, the first processing unit 12 is coupled to the light receiving unit 11 and able to receive the light signal for processing the light signal to a spectral data. The second processing unit 14 is coupled to the first processing unit 12 and has a conversion module, wherein the second processing unit 14 can further process the spectral data to a percent value of melatonin suppression based on a reference wavelength parameter and a reference quanta parameter through the conversion module 141, and transmit the percent value of melatonin suppression to the display unit 16 for displaying. In the framework of the melatonin suppression extent measuring device 1 of the present invention, the default value of the reference wavelength parameter is 480 nm, and the default value of the reference quanta parameter is $4.375 \times 10^{16}$ photons/cm$^2$.

The first memory unit 13 is coupled to the first processing unit 12 for storing the spectral data, wherein the first memory unit 13 can be a memory card or a hard disk; preferably, in the framework of the melatonin suppression extent measuring device 1, it uses the memory card as the first memory unit 13. The second memory unit 15 is coupled to the second processing unit 14 for storing the percent value of melatonin suppression. The same to the first memory unit 13, the second memory unit 15 can be a memory card or a hard disk, and preferably, in the framework of the melatonin suppression extent measuring device 1, it uses the memory card as the second memory unit 15.

The power management unit 17 is coupled to the light receiving unit 11, the first processing unit 12, the second processing unit 14, and the display unit 16 for providing power to the light receiving unit 11, the first processing unit 12, the second processing unit 14, and the display unit 16. The power management unit 17 can be a battery or a power supply; however, considering to volume of the melatonin suppression extent measuring device 1, preferably, in the framework of the melatonin suppression extent measuring device 1, it used the battery as the power management unit 17.

Figure 4:
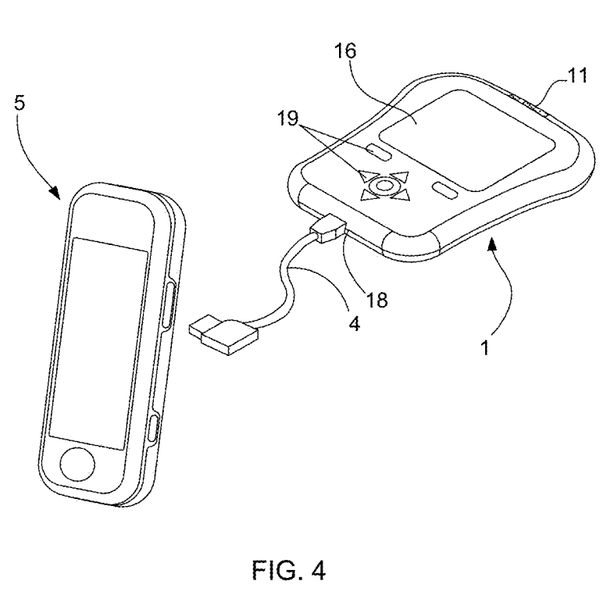
FIG. 4 is a second schematic stereo diagram of melatonin suppression extent measuring device according to the present invention.

Please refer to FIG. 2 and FIG. 3 again, simultaneously, please refer to FIG. 4, which illustrates a second schematic stereo diagram of melatonin suppression extent measuring device according to the present invention. The connecting unit 18 is coupled to the second processing unit 14. As shown in FIG. 3, the connecting unit 18 is an USB connector and capable of being electrically connected to an external electronic device 2 through an USB connector cable, for example, an notebook, so that the second processing unit 14 can transmit the spectral data stored in the first memory unit 13 and the percent value of melatonin suppression stored in the second memory unit 15 to the electronic device 2. Or, as shown in FIG. 4, the connecting unit 18 can also be a MiniUSB connector and adopted for being connected to a smart phone 5 via a MiniUSB connector cable, such that the second processing unit 14 can transmit the spectral data and the percent value of melatonin suppression to the electronic device 2. Besides, the connecting unit 18 can also be a MicroUSB connector.

As shown in FIG. 2, FIG. 3 and FIG. 4, the input unit 19 is coupled to the second processing unit 14, wherein the input unit 19 is a keystroke set. Through the keystroke set, the reference wavelength parameter and the reference quanta parameter provided to the conversion module 141 for converting the spectral data to the percent value of melatonin suppression can be set or changed. Moreover, what must to be especially introduced is that, in the framework of the melatonin suppression extent measuring device 1, the conversion module 141 includes a first conversion function group and a second conversion function group, and the conversion module 141 utilize the first conversion function group and the second conversion function group for converting the spectral data to the percent value of melatonin suppression, wherein the first conversion function group consists the functions three functions of:

(1) $S_{PQ}(\lambda)$, defined as a function of suppression power per quanta for a given monochromatic light, and equal to $FQ(\lambda) = 10^{(\lambda - \lambda r)/FI}$, wherein $\lambda r$ is defined as a reference optical wavelength, that is, 480 nm or the inputted reference wavelength parameter; Besides, FI is a fitting index ranging in 70~100, and preferable, in the framework of the melatonin suppression extent measuring device 1, the value of the fitting index is 75;

(2) $S_{PQC}(\lambda)$, defined as a function of correlated suppression power per quanta for a given polychromatic light. The function $S_{PQC}(\lambda)=[\int S_{PQ}(\lambda)S_f(\lambda)d\lambda]/[\int S_f(\lambda)d\lambda]$, wherein $S_f(\lambda)$ is defined as a function of experimentally measured spectral intensity, i.e., the spectral data processed by the first processing unit 12; and (3) $y(\lambda)$, defined as a function of extent of suppression upon exposing an x dose, the function $y(\lambda)=[y_0(\lambda)-y_\infty(\lambda)]/\{[1+(x(\lambda)/x_{1/2}(\lambda))_S]+y_\infty(\lambda)\}$, wherein $y_0(\lambda)$ is defined as a suppression level before exposure, $y_\infty(\lambda)$ is defined as an ultimate suppression level, $x_{1/2}(\lambda)$ is defined as the a dose required to cause one half of the ultimate suppression level, and $x_{1/2}(\lambda)=x_{1/2}(\lambda r)10^{(\lambda-\lambda r)/FI}$, moreover, $x(\lambda)$ is defined as a required dose and S is defined as an estimate slope of $y_0(\lambda)$ and $y_\infty(\lambda)$.

Moreover, the second conversion function group consists the functions two functions of:

(4) $S_{PLC}(\lambda)$, defined as a function of correlated suppression power per lumen for a given polychromatic light, and the function $S_{PLC}(\lambda)=C_2[\int \lambda S_{PQ}(\lambda)S_f(\lambda)d\lambda]/[\int L(\lambda)S_f(\lambda)d\lambda]$, wherein $L(\lambda)$ is defined as a photopic luminosity function and $C_2$ is defined as a lumped constant; and (5) $t_{L, y, \lambda}$, defined as an exposure time function, the function $t_{L, y, \lambda}=[S_{PL}(\lambda r)t_{L, y, \lambda r}]/S_{PLC}(\lambda)$, wherein $S_{PL}(\lambda r)$ is defined as a function of suppression power per lumen for a reference monochromatic light, $t_{L, y, \lambda r}$ is defined as an exposure time function for the reference monochromatic light and $\lambda r$ is defined as a reference optical wavelength.

Figure 5:
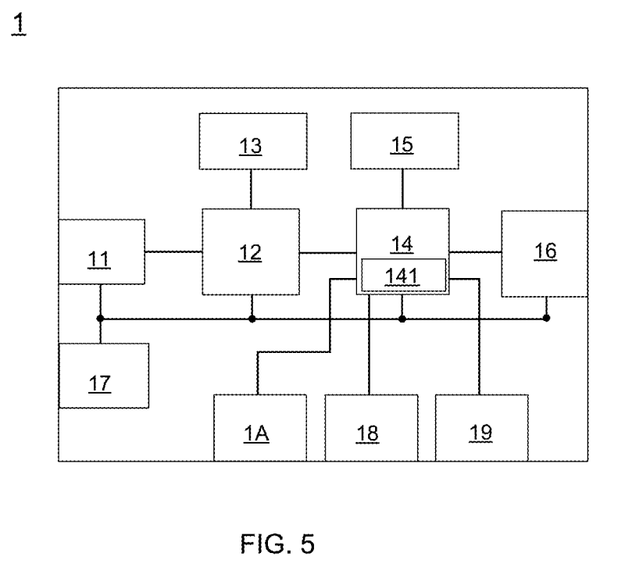
FIG. 5 is a framework view of a second embodiment of the melatonin suppression extent measuring device according to the present invention.

Thus, above descriptions have been clearly introduced and disclosed the melatonin suppression extent measuring device of the present invention. In addition, the present invention further includes a second embodiment for exemplarily introducing the melatonin suppression extent measuring device. Please refer to FIG. 5, which illustrates a framework view of a second embodiment of the melatonin suppression extent measuring device according to the present invention. As shown in FIG. 5, the second embodiment of the melatonin suppression extent measuring device 1 includes: a light receiving unit 11, a first processing unit 12, a first memory unit 13, a second processing unit 14, a second memory unit 15, a display unit 16, a power management unit 17, a connecting unit 18, an input unit 19, and a wireless transmission module 1A, wherein the light receiving unit 11, the first processing unit 12, the first memory unit 13, the second processing unit 14, the second memory unit 15, the display unit 16, the power management unit 17, the connecting unit 18, and the input unit 19 in the second embodiment are respectively the same to the light receiving unit 11, the first processing unit 12, the first memory unit 13, the second processing unit 14, the second memory unit 15, the display unit 16, the power management unit 17, the connecting unit 18, and the input unit 19 in the aforesaid embodiment of the melatonin suppression extent measuring device 1.

Figure 6:
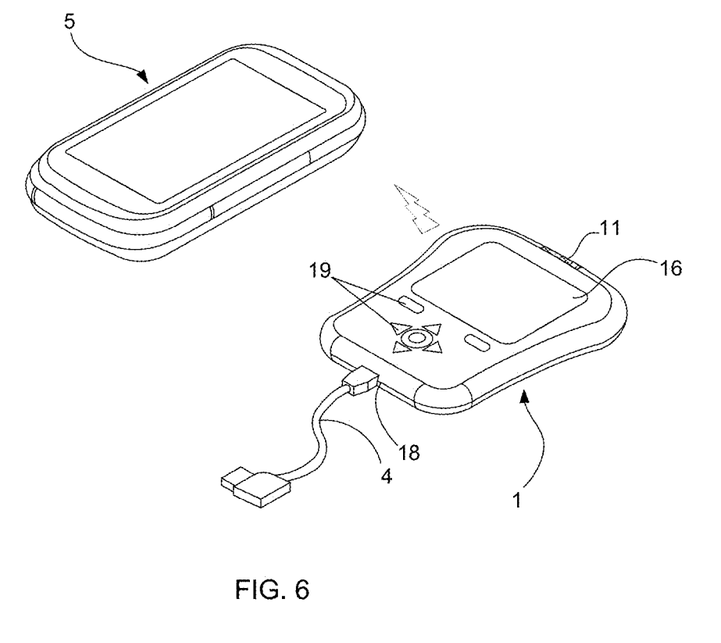
FIG. 6 is a schematic stereo diagram of the second embodiment of the melatonin suppression extent measuring device.

Please continuously refer to FIG. 5, and simultaneously refer to FIG. 6, which illustrates a schematic stereo diagram of the second embodiment of the melatonin suppression extent measuring device. As shown in FIG. 5 and FIG. 6, the wireless transmission module 1A is coupled to the second processing unit 14, wherein the wireless transmission module 1A can be a Wi-Fi wireless transmission module, a RFID wireless transmission module, a Bluetooth wireless transmission module, an infrared ray wireless transmission module, and a Zigbee wireless transmission module. The second processing unit 14 is able to transmit the spectral data and the percent value of melatonin suppression to the smart phone 5 through the wireless transmission module 1A.

Figure 7:
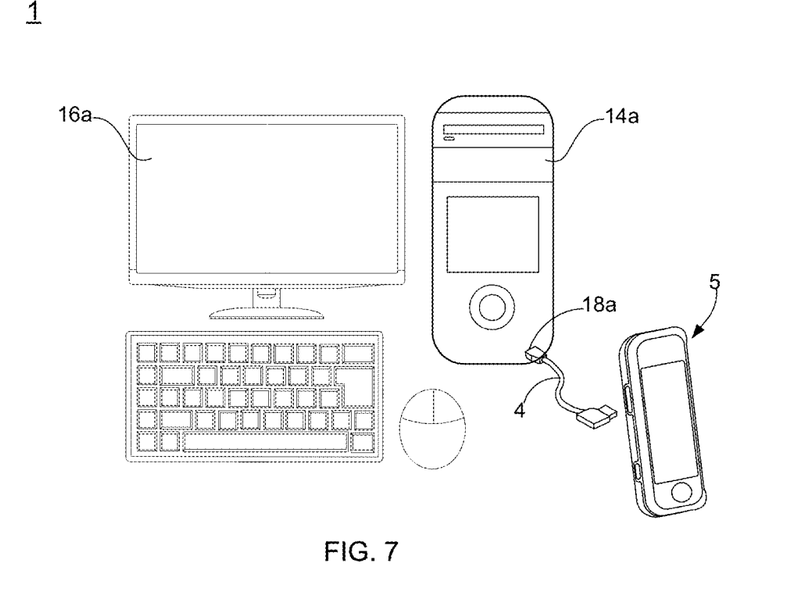
FIG. 7 is a framework view of a third embodiment of the melatonin suppression extent measuring device according to the present invention.

Furthermore, the present invention also includes a third embodiment for exemplarily introducing the melatonin suppression extent measuring device. Please refer to FIG. 7, which illustrates a framework view of a third embodiment of the melatonin suppression extent measuring device according to the present invention. As shown in FIG. 7, the third embodiment of the melatonin suppression extent measuring device 1 includes: a processing unit 14a and a display unit 16a, wherein the processing unit 14a is a host computer with a first conversion function group and a second conversion function group, and the host computer is able to process a spectral data to a percent value of melatonin suppression based on a reference wavelength parameter and a reference quanta parameter by way of the first conversion function group and the second conversion function group. Herein, what must to be noted is that, the spectral data can not only be obtained by using a spectrometer or a spectrum analyzer, but also be gotten from some public references, such as literatures and papers. The display unit 16a is a LCD coupled to the processing unit 14a, which is used for displaying the percent value of melatonin suppression.

Moreover, for the third embodiment of the melatonin suppression extent measuring device 1, it can further include a power management unit (not show in FIG. 7), a connecting unit 18a and an input unit 19a. The power management unit is a power supply of the host computer. The connecting unit 18a is coupled to the processing unit 14a for being electrically connected to an external electronic device, for instance, a smart phone 5, so that the processing unit 14a can transmit the spectral data and the percent value of melatonin suppression to the smart phone 5 through the connecting unit 18a. The input unit 19a is a keyboard/mouse set, and through the keyboard/mouse set, the reference wavelength parameter and the reference quanta parameter provided to the first conversion function group and the second conversion function group of the host computer for converting the spectral data to the percent value of melatonin suppression can be set or changed.

For the third embodiment of the melatonin suppression extent measuring device 1, the first conversion function group includes three functions, which are, function (1), function (2) and function (3) introduced in aforesaid embodiment of the melatonin suppression extent measuring device; moreover, the second conversion function group includes two functions, which are, function (4) and function (5) introduced in aforesaid embodiment of the melatonin suppression extent measuring device. In the third embodiment, it must to note that, the first conversion function group and the second conversion function group are able to be implemented to an Excel® software, therefore, a user can input the reference wavelength parameter and the reference quanta parameter into the Excel® software, after that, if the user want to calculate how many melatonin suppression extent are caused by a color light with 700 nm wavelength, it merely inputs the spectral data and wavelength value (i.e., 700 nm) into the Excel® software, then the percent value of melatonin suppression is automatically calculated. However, the first conversion function group and the second conversion function group are not intended to be limited for being implemented to the Excel® software, the first conversion function group and the second conversion function group can also be implemented to any software capable of executing formula and function operation, for example, C, C++, MATLAB, Fortran, Visual Basic, etc.

Thus, through the above descriptions, the melatonin suppression extent measuring device of the present invention has been disclosed completely and clearly in the above description. In summary, the present invention has the following advantages:

1. In the present invention, it utilize the light receiving unit to receive a light signal, and transmit the light signal to the first processing unit, then the processing unit process the light signal to a spectral data, and furthermore, the second processing unit can process the spectral data to a percent value of melatonin suppression based on a reference wavelength parameter and a reference quanta parameter through the conversion module, and show the percent value of melatonin suppression in a display unit, so that human can exactly know how many melatonin suppression extent are caused by the light environment which is exposing himself body.

2. In the present invention, the second processing unit induces a conversion module, and the conversion module has a first conversion function group and a second conversion function group for accurately processing and converting the spectral data to the percent value of melatonin suppression.

3. Inheriting to above point 2, moreover, by way of an input unit, a user can input different reference wavelength parameters and reference quanta parameters with the difference of the exposing light environment thereof, such that the second processing unit can precisely process the spectral data to the percent value of melatonin suppression based on the inputted reference wavelength parameter and the inputted reference quanta parameter through the conversion module.

4. In the present invention, by way of a connecting unit or a wireless transmission module, the melatonin suppression extent measuring device can electrically connect with an electronic device for transmitting the spectral data store in the first memory unit and the percent value of melatonin suppression store in the second memory unit to the electronic device.

The above description is made on embodiments of the present invention. However, the embodiments are not intended to limit scope of the present invention, and all equivalent implementations or alterations within the spirit of the present invention still fall within the scope of the present invention.

I claim:

1. A melatonin suppression extent measuring device, comprising:
   a light receiving unit, being adopted for receiving a light signal;
   a first processing unit, being coupled to the light receiving unit, wherein the first processing unit is able to receive and process the light signal to a spectral data;
   a first memory unit, being coupled to the first processing unit for storing the spectral data;
   a second processing unit, being coupled to the first processing unit and having a conversion module, wherein the second processing unit can further process the spectral data to a percent value of melatonin suppression based on a reference wavelength parameter and a reference quanta parameter through the conversion module;
   a second memory unit, being coupled to the second processing unit for storing the percent value of melatonin suppression;
   a display unit, being coupled to the second processing unit and used for displaying the percent value of melatonin suppression; and
   a power management unit, being coupled to the light receiving unit, the first processing unit, the second processing unit, and the display unit for providing power to the light receiving unit, the first processing unit, the second processing unit, and the display unit.

2. The melatonin suppression extent measuring device of claim 1, further comprising:
   a connecting unit, being coupled to the second processing unit, used for electrically connecting to an external electronic device, so as to transmit the spectral data and the percent value of melatonin suppression to the electronic device; and
   an input unit, being coupled to the second processing unit, wherein the reference wavelength parameter and the reference quanta parameter provided to the conversion module for converting the spectral data to the percent value of melatonin suppression can be set through the input unit.

3. The melatonin suppression extent measuring device of claim 2, wherein the input unit is a keystroke set.

4. The melatonin suppression extent measuring device of claim 2, wherein the connecting unit is selected from the group consisting of: USB connector, MiniUSB connector and MicroUSB connector.

5. The melatonin suppression extent measuring device of claim 2, further comprising a wireless transmission module, which is coupled to the second processing unit, so that the second processing unit is able to transmit the spectral data and the percent value of melatonin suppression to the electronic device through the wireless transmission module.

6. The melatonin suppression extent measuring device of claim 5, wherein the wireless transmission module is selected from the group consisting of: Wi-Fi wireless transmission module, RFID wireless transmission module, Bluetooth wireless transmission module, infrared ray wireless transmission module, and Zigbee wireless transmission module.

7. The melatonin suppression extent measuring device of claim 1, wherein the first memory unit is selected from the group consisting of: memory card and hard disk.

8. The melatonin suppression extent measuring device of claim 1, wherein the second memory unit is selected from the group consisting of: memory card and hard disk.

9. The melatonin suppression extent measuring device of claim 1, wherein the power management unit is selected from the group consisting of: battery and power supply.

10. The melatonin suppression extent measuring device of claim 1, wherein the conversion module comprises a first conversion function group consisting three functions of:
   (1) $S_{PQ}(\lambda)$, defined as a function of suppression power per quanta for a given monochromatic light, and the function $S_{PQ}(\lambda)$ is equal to $F_Q(\lambda)=10^{(\lambda-\lambda_r)/FI}$, wherein $\lambda_r$ is defined as a reference optical wavelength and FI defined as a fitting index;
   (2) $S_{PQC}(\lambda)$, defined as a function of correlated suppression power per quanta for a given polychromatic light, and the function $S_{PQC}(\lambda)=[\int S_{PQ}(\lambda)S_I(\lambda)d\lambda]/[\int \lambda S_I(\lambda)d\lambda]$, wherein $S_I(\lambda)$ is defined as a function of experimentally measured spectral intensity; and
   (3) $y(\lambda)$, defined as a function of extent of suppression upon exposing an x dose, and the function $y(\lambda)=[y_0(\lambda)-y_\infty(\lambda)]/\{[1+(x(\lambda)/x_{1/2}(\lambda))^S]+y_\infty(\lambda)\}$, wherein $y_0(\lambda)$ is defined as a suppression level before exposure, $y_\infty(\lambda)$ being defined as an ultimate suppression level, $x_{1/2}(\lambda)$ being defined as the a dose required to cause one half of the ultimate suppression level, and $x_{1/2}(\lambda)=x_{1/2}(\lambda_r) 10^{(\lambda-\lambda_r)/FI}$, moreover, $x(\lambda)$ being defined as a required dose and S being defined as an estimate slope of $y_0(\lambda)$ and $y_\infty(\lambda)$.

11. The melatonin suppression extent measuring device of claim 10, wherein the conversion module further comprises a second conversion function group consisting two functions of:
  (4) $S_{PLC}(\lambda)$, defined as a function of correlated suppression power per lumen for a given polychromatic light, the function $S_{PLC}(\lambda)=C_2[\int \lambda S_{PQ}(\lambda)S_f(\lambda)d\lambda]/[\int L(\lambda)S_f(\lambda)d\lambda]$, wherein $L(\lambda)$ is defined as a photopic luminosity function, and $C_2$ being defined as a lumped constant; and
  (5) $t_{L, y, \lambda}$, defined as an exposure time function, the function $t_{L, y, \lambda}=[S_{PL}(\lambda_r)t_{L, y, \lambda_r}]/S_{PLC}(\lambda)$, wherein $S_{PL}(\lambda_r)$ is defined as a function of suppression power per lumen for a reference monochromatic light, $t_{L, y, \lambda_r}$ being defined as an exposure time function for the reference monochromatic light, and $\lambda_r$ being defined as a reference optical wavelength.

12. The melatonin suppression extent measuring device of claim 10, wherein the fitting index is ranged in 70~100.

13. A melatonin suppression extent measuring device 1, comprising:
  a processing unit, having a first conversion function group and a second conversion function group, wherein the processing unit is able to process a spectral data to a percent value of melatonin suppression based on a reference wavelength parameter and a reference quanta parameter by way of the first conversion function group and the second conversion function group; and
  a display unit, being coupled to the processing unit for displaying the percent value of melatonin suppression.

14. The melatonin suppression extent measuring device of claim 13, further comprising:
  a power management unit, being coupled to the processing unit and the display unit for providing power to the processing unit and the display unit;
  a connecting unit, being coupled to the processing unit, used for electrically connecting to an external electronic device, so as to transmit the spectral data and the percent value of melatonin suppression to the electronic device; and
  an input unit, being coupled to the processing unit, wherein the reference wavelength parameter and the reference quanta parameter provided to the first conversion function group and the second conversion function group for converting the spectral data to the percent value of melatonin suppression can be set through the input unit.

15. The melatonin suppression extent measuring device of claim 14, wherein the power management unit is a power supply.

16. The melatonin suppression extent measuring device of claim 14, wherein the input unit is a keyboard/mouse set.

17. The melatonin suppression extent measuring device of claim 14, wherein the connecting unit is selected from the group consisting of: USB connector, MiniUSB connector and MicroUSB connector.

18. The melatonin suppression extent measuring device of claim 13, wherein the first conversion function group consisting three functions of:
  (1) $S_{PQ}(\lambda)$, defined as a function of suppression power per quanta for a given monochromatic light, and the function $S_{PQ}(\lambda)$ is equal to $F_Q(\lambda)=10^{(\lambda-\lambda_r)/FI}$, wherein $\lambda_r$ is defined as a reference optical wavelength and FI defined as a fitting index;
  (2) $S_{PQC}(\lambda)$, defined as a function of correlated suppression power per quanta for a given polychromatic light, and the function $S_{PQC}(\lambda)=[\int S_{PQ}(\lambda)S_f(\lambda)d\lambda]/[\int S_f(\lambda)d\lambda]$, wherein $S_f(\lambda)$ is defined as a function of experimentally measured spectral intensity; and
  (3) $y(\lambda)$, defined as a function of extent of suppression upon exposing an x dose, and the function $y(\lambda)=[y_0(\lambda)-y_\infty(\lambda)]/\{[1+(x(\lambda)/x_{1/2}(\lambda))^S]+y_\infty(\lambda)\}$, wherein $y_0(\lambda)$ is defined as a suppression level before exposure, $y_\infty(\lambda)$ being defined as an ultimate suppression level, $x_{1/2}(\lambda)$ being defined as the a dose required to cause one half of the ultimate suppression level, and $x_{1/2}(\lambda)=x_{1/2}(\lambda_r)10^{(\lambda-\lambda_r)/FI}$, moreover, $x(\lambda)$ being defined as a required dose and S being defined as an estimate slope of $y_0(\lambda)$ and $y_\infty(\lambda)$.

19. The melatonin suppression extent measuring device of claim 13, wherein the second conversion function group consisting two functions of:
  (4) $S_{PLC}(\lambda)$, defined as a function of correlated suppression power per lumen for a given polychromatic light, the function $S_{PLC}(\lambda)=C_2[\int \lambda S_{PQ}(\lambda)S_f(\lambda)d\lambda]/[\int L(\lambda)S_f(\lambda)d\lambda]$, wherein $L(\lambda)$ is defined as a photopic luminosity function, and $C_2$ being defined as a lumped constant; and
  (5) $t_{L, y, \lambda}$, defined as an exposure time function, the function $t_{L, y, \lambda}=[S_{PL}(\lambda_r)t_{L, y, \lambda_r}]/S_{PLC}(\lambda)$, wherein $S_{PL}(\lambda_r)$ is defined as a function of suppression power per lumen for a reference monochromatic light, $t_{L, y, \lambda_r}$ being defined as an exposure time function for the reference monochromatic light, and $\lambda_r$ being defined as a reference optical wavelength.

20. The melatonin suppression extent measuring device of claim 13, further comprising a wireless transmission module, which is coupled to the processing unit, so that the processing unit can transmit the spectral data and the percent value of melatonin suppression to the electronic device through the wireless transmission module.

* * * * *